United States Patent
Aurongzeb et al.

(10) Patent No.: US 12,422,938 B2
(45) Date of Patent: Sep. 23, 2025

(54) METHOD OF MANUFACTURE AND APPARATUS FOR SUSTAINABLE DOUBLE INJECTED HOUSING FOR A MOUSE

(71) Applicant: Dell Products, LP, Round Rock, TX (US)

(72) Inventors: Deeder M. Aurongzeb, Austin, TX (US); Peng Lip Goh, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 47 days.

(21) Appl. No.: 18/240,678

(22) Filed: Aug. 31, 2023

(65) Prior Publication Data

US 2025/0076998 A1 Mar. 6, 2025

(51) Int. Cl.
| | |
|---|---|
| G06F 3/0354 | (2013.01) |
| B29C 45/13 | (2006.01) |
| B29K 55/02 | (2006.01) |
| B29K 67/00 | (2006.01) |
| B29K 105/26 | (2006.01) |
| B29L 31/34 | (2006.01) |

(52) U.S. Cl.
CPC .......... *G06F 3/03543* (2013.01); *B29C 45/13* (2013.01); *B29K 2055/02* (2013.01); *B29K 2067/003* (2013.01); *B29K 2105/26* (2013.01); *B29L 2031/3481* (2013.01)

(58) Field of Classification Search
CPC . G06F 3/03543; B29C 45/13; B29K 2055/02; B29K 2067/003; B29K 2105/26; B29L 2031/3481
See application file for complete search history.

(56) References Cited

U.S. PATENT DOCUMENTS

| | | | |
|---|---|---|---|
| 4,862,165 A | 8/1989 | Gart | |
| 5,157,381 A | 10/1992 | Cheng | |
| 5,805,144 A | 9/1998 | Scholder | |
| 5,883,619 A | 3/1999 | Ho | |
| 6,198,473 B1 | 3/2001 | Armstrong | |
| 9,069,395 B2 | 6/2015 | Adan | |
| 9,261,984 B2 | 2/2016 | Farag | |
| 10,983,609 B2 | 4/2021 | Shayani | |
| 11,061,485 B2 | 7/2021 | Lien | |
| 11,494,005 B2 | 11/2022 | Cheng | |
| 2019/0230728 A1* | 7/2019 | Chien | G06F 3/0231 |
| 2021/0303086 A1* | 9/2021 | Lien | G06F 3/0354 |

* cited by examiner

*Primary Examiner* — Deeprose Subedi
(74) *Attorney, Agent, or Firm* — Prol Intellectual Property Law, PLLC; H. Kenneth Prol

(57) ABSTRACT

A system and method of assembly for a double-injection molded mouse housing for a mouse comprising a first injection molded inner housing shell of ocean bound plastic (OBP) of the double-injection molded mouse housing, a second injection molded outer housing shell of a plastic with higher thermal stability than the OBP to form the double-injection molded mouse housing, a keyplate panel operatively coupled to the top of the double-injection molded mouse housing, and a bottom case panel operatively coupled to the bottom of the double-injection molded mouse housing. The double-injection molded mouse housing components including a printed circuit board with microcontroller, position detector, scroll wheel detector and other components.

20 Claims, 6 Drawing Sheets

METHOD OF MANUFACTURE AND APPARATUS FOR SUSTAINABLE DOUBLE INJECTED HOUSING FOR A MOUSE

FIELD OF THE DISCLOSURE

The present disclosure generally relates to peripheral input/output (I/O) devices, such as mice, keyboards, earbuds, headphones, headsets, and virtual reality peripherals as well as other wireless peripheral devices. More specifically, the present disclosure relates to an apparatus and method of manufacture for a sustainable housing for a peripheral mouse.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may be operatively coupled, wirelessly or by wired coupling, to one or more wireless or wired peripheral I/O devices such as a mouse, keyboard, touchpad, display device, wearable peripheral device, speakers, earbud, headphone, microphone, or other peripheral devices. In particular, a mouse may be a handheld peripheral I/O device for a user to interact with an information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
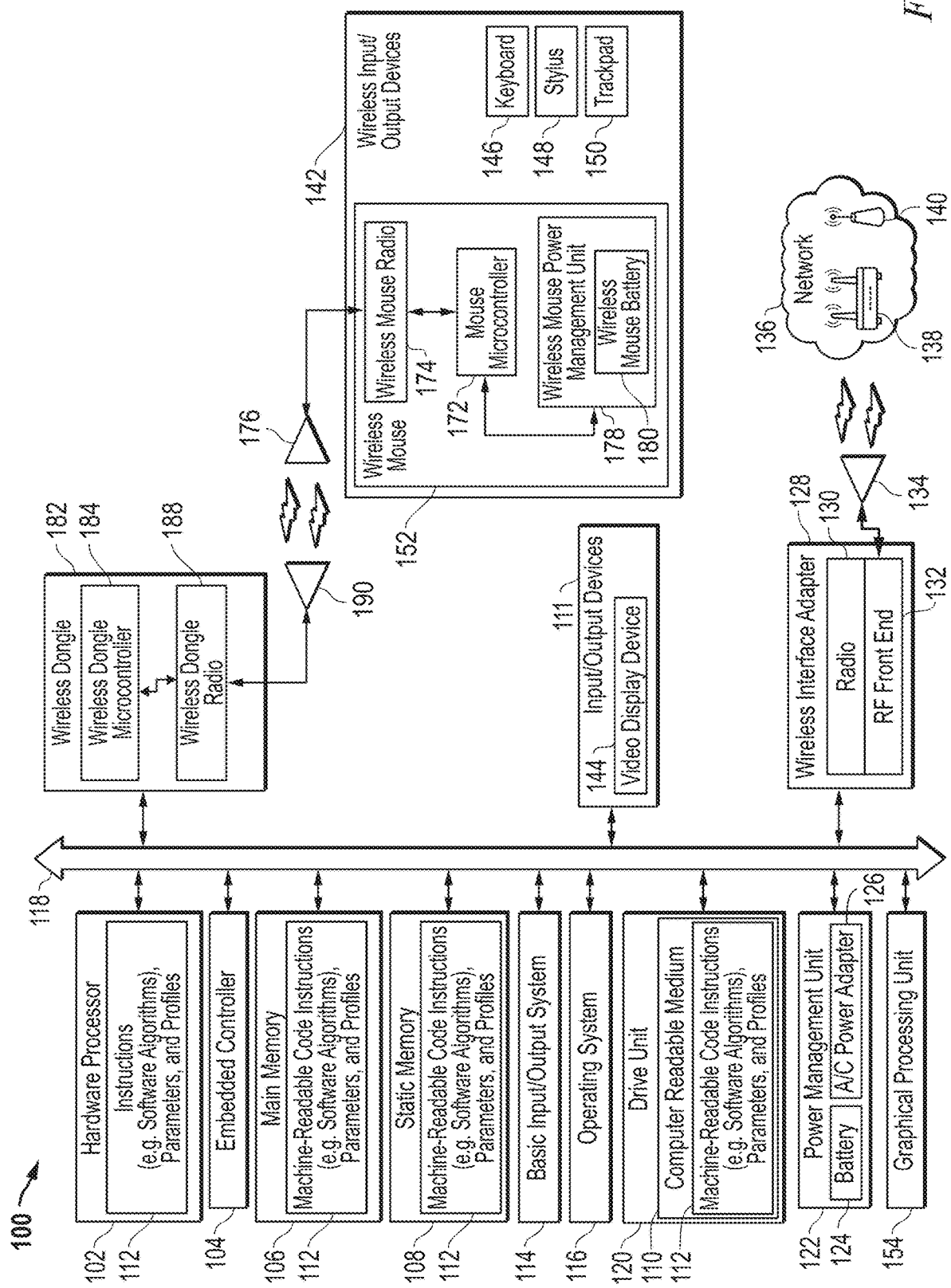
FIG. 1 is a block diagram of an information handling system according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Users of information handling systems such as smart phones, tablets, or laptops may employ a plurality of wireless peripheral input/output (I/O) devices also referred to as wireless I/O devices herein (e.g., mouse, keyboard, earbuds, headphones, smart speakers, headsets including headphones and speakers, or virtual reality peripherals) located remotely from the information handling system to wirelessly transmit and receive I/O data such as keystrokes, mouse positional data, or audiovisual information. Many existing systems employ a wireless communication adapter/dongle operably connected to the information handling system (e.g., desktop, laptop, or tablet computer) to pair with and communicate wirelessly with one or more of these wireless I/O devices, such as with a wireless mouse. In other embodiments, a wireless communication adapter/dongle may be integrated as part of the wireless radio adapter internal to the information handling system for pairing with and communicating wirelessly with one or more of these wireless I/O devices, such as a wireless mouse. In yet other embodiments, peripheral I/O devices may be wired, such as a wired mouse. Many manufacturers of these wireless I/O devices build housings for these devices from plastics or other similar synthetic materials. It is, however, desirable to re-utilize materials such as recycled plastics or similar synthetic materials to provide a reduced carbon footprint for production of housing for a mouse, for example. Further, re-utilization of plastic materials retrieved from the oceans, rivers, shorelines or other similar areas, referred to as ocean-bound plastic (OBP), in housings for a mouse or other I/O devices is also desirable to reduce carbon production and consumption for new plastics where possible.

During shipping or storage of mice or I/O devices, the housings made of these re-utilized plastic materials, such as OBP housings, may be exposed to high temperatures, large temperature fluctuations, or other environmental exposures. Due to the nature of re-utilized plastic materials, such as OBP, these re-utilized plastic materials may be subject to warping or other imperfections upon exposure to temperature variations or other environmental extremes causing flaws or problems with an end-product such as a mouse housing. The tendency of housings made with OBP to warp and create a damaged product relative to, for example, a mouse housing made of acrylonitrile butadiene styrene (ABS), makes use of such re-utilized plastic materials difficult to deploy with a mouse housing in a final mouse product. The embodiments of the present disclosure provide for a double-injected housing for a mouse providing for utilization of OBP for a sub-structure of the mouse housing while minimizing utilization of new plastic material or heavily processed recycled material, such as ABS, for structural support and to prevent warping or imperfections from appearing in the mouse housing upon shipment or storage. Embodiments of the present disclosure provide for a mouse housing apparatus for this double-injected mouse housing including a sub-structure inner housing shell portion and an outer-housing shell portion which may be injected into a mouse housing mold in any extrusion order in varying embodiments. The resulting double-injected mouse housing utilizes less new plastic material and allows a substantial portion of the produced mouse housing to re-utilize this OBP material. Further, embodiments of the present disclosure describe a method of manufacture or assembly for a double-injected mouse housing having the inner housing shell portion and an outer housing shell portion.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a tablet, a smartphone, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), non-volatile (read-only memory, flash memory etc.) or any combination thereof), one or more hardware processing resources, such as a central processing unit (CPU), a graphics processing unit (GPU), an embedded controller (EC), a hardware processor, hardware controllers, or any combination thereof. In an embodiment, the hardware processor may include a central processing unit (CPU) that participates in a booting process to invoke and execute pre-boot and boot firmware, and an operating system (OS) described herein. Additional components of the information handling system 100 can include one or more storage devices, one or more communications ports for communicating with external devices, as well as various wireless input and output (I/O) devices 142, such as a keyboard 146, a mouse 152, a video display device 144, a stylus 148, a trackpad 150, or any combination thereof. In an embodiment, any of these I/O devices may also be wired I/O devices 111. In an embodiment, for example, mouse 152 may be wired or wireless and may be used with the information handling system 100. The information handling system 100 can also include one or more buses operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above and operates to perform one or more of the methods described herein. The information handling system 100 may execute machine-readable code instructions 112 via the described hardware processing resources that may operate on servers or systems, remote data centers, or on-box in individual client information handling systems according to various embodiments herein. In some embodiments, it is understood any or all portions of machine-readable code instructions 112 may operate on a plurality of information handling systems 100.

As described herein, the information handling system 100 may include hardware processing resources such as a hardware processor 102, a central processing unit (CPU), accelerated processing unit (APU), an EC 104, a neural processing unit (NPU), a vision processing unit (VPU), a digital signal processor (DSP), a GPU 154, a microcontroller, or any other type of hardware processing device that executes code instructions to perform some of the processes described herein. Any of the hardware processing resources may operate to execute code that is either firmware or software code. Moreover, the information handling system 100 can include memory devices such as main memory 106, static memory 108, computer readable medium 110 storing machine-readable code instructions 112 (e.g., embodied as firmware in some embodiments) of, in an example embodiment, wireless peripheral device (PD) drivers, or other computer executable program code and firmware, and drive unit 120 (volatile (e.g., random-access memory, etc.), non-volatile (read-only memory, flash memory etc.) or any combination thereof). These memory devices may be accessed by any of the hardware processors (e.g., the CPU) described herein to access computer-readable program code of wireless I/O device drivers or other software and firmware to facilitate the wireless communication between a wired adapter, a wireless interface adapter 128 or a wireless dongle radio 188, and with a wireless I/O device such as a wireless mouse 152 as described herein. In the present specification and in the appended claims, the term "module" is meant to include that firmware, software, and/or a combination of firmware and software that is used during pre-boot, boot, and runtime stages as described herein. In an embodiment, the modules may be stored on a read-only memory device. It is appreciated, as well, that any of the modules described herein may be stored on a single or multiple memory devices and may be addressable by the CPU (e.g., hardware processor 102).

As shown, the information handling system 100 may further include a video display device 144. The video display device 144, in an embodiment, may function as a liquid crystal display (LCD), an organic light emitting diode (OLED), a flat panel display, or a solid-state display. Although FIG. 1 shows a single video display device 144, the present specification contemplates that multiple video display devices 144, any of which may be wired or wireless, may be used with the information handling system to facilitate an extended desktop scenario, for example. Additionally, the information handling system 100 may include one or more input/output devices 142 including an alpha numeric input device such as a keyboard 146 and/or a cursor control device, such as a wired or wireless mouse 152, touchpad/trackpad 150, a stylus 148, or a gesture or touch screen input device associated with the video display device 144 that allow a user to interact with the images, windows, and applications presented to the user.

A network interface device of the information handling system 100 shown as wireless interface adapter 128 or wireless dongle 182 can provide radio connectivity among devices such as with Bluetooth® or, in embodiments here Bluetooth® Low Energy (BLE), to a wireless I/O device and/or network 136, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 138 or base station 140 used to operatively couple the information handling system 100 to a network 136. Wireless interface adapter 128 may include one or more radio frequency (RF) subsystems (e.g., radio 130) with transmitter/receiver circuitry, modem circuitry, one or more radio frequency (RF) front end 132 circuits, one or more wireless controller circuits, amplifiers, antennas 134 and other circuitry of the radio 130 such as one or more antenna ports used for wireless communications via multiple radio access technologies (RATs). In an embodiment, the wireless interface adapter 128 may operate in accordance with any wireless data communication standards. To communicate with a wireless local area network, standards including IEEE 802.11 WLAN standards (e.g., IEEE 802.1 lax-2021 (Wi-Fi 6E, 6 GHz)), IEEE 802.15 WPAN standards, WWAN such as 3GPP or 3GPP2, Bluetooth® standards, or similar wireless standards may be used for radio layer connectivity. It is appreciated that the wireless interface adapter 128 may also be used to communicate with a wireless I/O device such as the wireless mouse 152 described herein using BLE radio protocol at, for example, the 2.4 GHz band in embodiments herein. As described herein, the information handling system 100 includes a hardware processor 102 used to generate computer readable instructions to a wireless dongle 182 to communicate with a wireless I/O device such as the wireless mouse 152. The present specification contemplates that other hardware processing devices may be used to conduct communication processes such as a wireless dongle microcontroller 184 executing instructions for a wireless dongle radio 188 to communicate with the wireless mouse 152 or other wireless I/O devices 142.

In an embodiment, the information handling system 100 can include one or more sets of machine-readable code instructions, parameters, and profiles 112 that can be executed to cause the computer system to perform any one or more of the methods or computer-based functions disclosed herein. For example, machine-readable code instructions, parameters, and profiles 112 may execute, via hardware processing resources, various software applications, software agents, the BIOS 114 firmware and/or software, or other aspects or components. Again, the machine-readable code instructions, parameters, and profiles 112 described herein may be stored on a non-volatile memory device and made accessible to the EC 104, the hardware processor 102, a microcontroller unit (MCU), or other hardware processing resource for execution. Various software modules comprising application instructions of machine-readable code instructions, parameters, and profiles 112 may be coordinated by an operating system (OS) 116, and/or via an application programming interface (API). An example OS 116 may include Windows®, Android®, and other OS types known in the art. Example APIs may include Win 32, Core Java API, or Android APIs.

In an embodiment, the disk drive unit 120 and may include machine-readable code instructions, parameters, and profiles 112 in which one or more sets of machine-readable code instructions, parameters, and profiles 112 such as software can be embedded to be executed by the processor 102 or other hardware processing devices such as a GPU 154 to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the drive unit 120 during execution by the hardware processor 102, EC 104, or GPU 154 of information handling system 100. The main memory 106, GPU 154, EC 104, and the hardware processor 102 also may include computer-readable media.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like.

The information handling system 100 may also have read-only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102, and other hardware components described herein. The PMU 122 may control power to one or more components including the wireless dongle 182, the wireless interface adapter 128, the one or more drive units 120, the hardware processor 102 (e.g., CPU), the EC 104, the GPU 154, a video/graphic display device 144, or other wired input/output devices 142 such as the stylus 148, a mouse 152, a keyboard 146, and a trackpad 150 and other components that may require power when a power button has been actuated by a user. In an embodiment, the PMU 122 may monitor power levels and be electrically coupled, either wired or wirelessly, to the information handling system 100 to provide this power and coupled to bus 118 to provide or receive data or machine-readable code instructions. The PMU 122 may regulate power from a power source such as a battery 124 or AC power adapter 126. In an embodiment, the battery 124 may be charged via the AC power adapter 126 and provide power to the components of the information handling system 100, via wired connections as applicable, or when AC power from the AC power adapter 126 is removed. PMU 122 may include a hardware controller to operate with the EC 104 separately or together to execute machine-readable code instructions, parameters, and profiles 112 described herein at the information handling system 100.

It is appreciated that the wired or wireless mouse 152 may also comprise similar devices and computer-readable instructions and may also include a mouse controller 172 and a wireless mouse memory device used to access, store, and execute the computer-readable instructions. When the wired or wireless mouse 152 is a wireless mouse it includes a wireless mouse radio 174 that wirelessly communicates with the wireless interface adapter 128 of the information handling system 100 or the wireless dongle 182 via the wireless dongle antenna 190 and wireless dongle radio 188.

In a particular non-limiting, exemplary embodiment, the computer-readable medium can include a solid-state memory such as a memory card or other package that houses one or more non-volatile read-only memories or volatile type memory. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, ARM® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
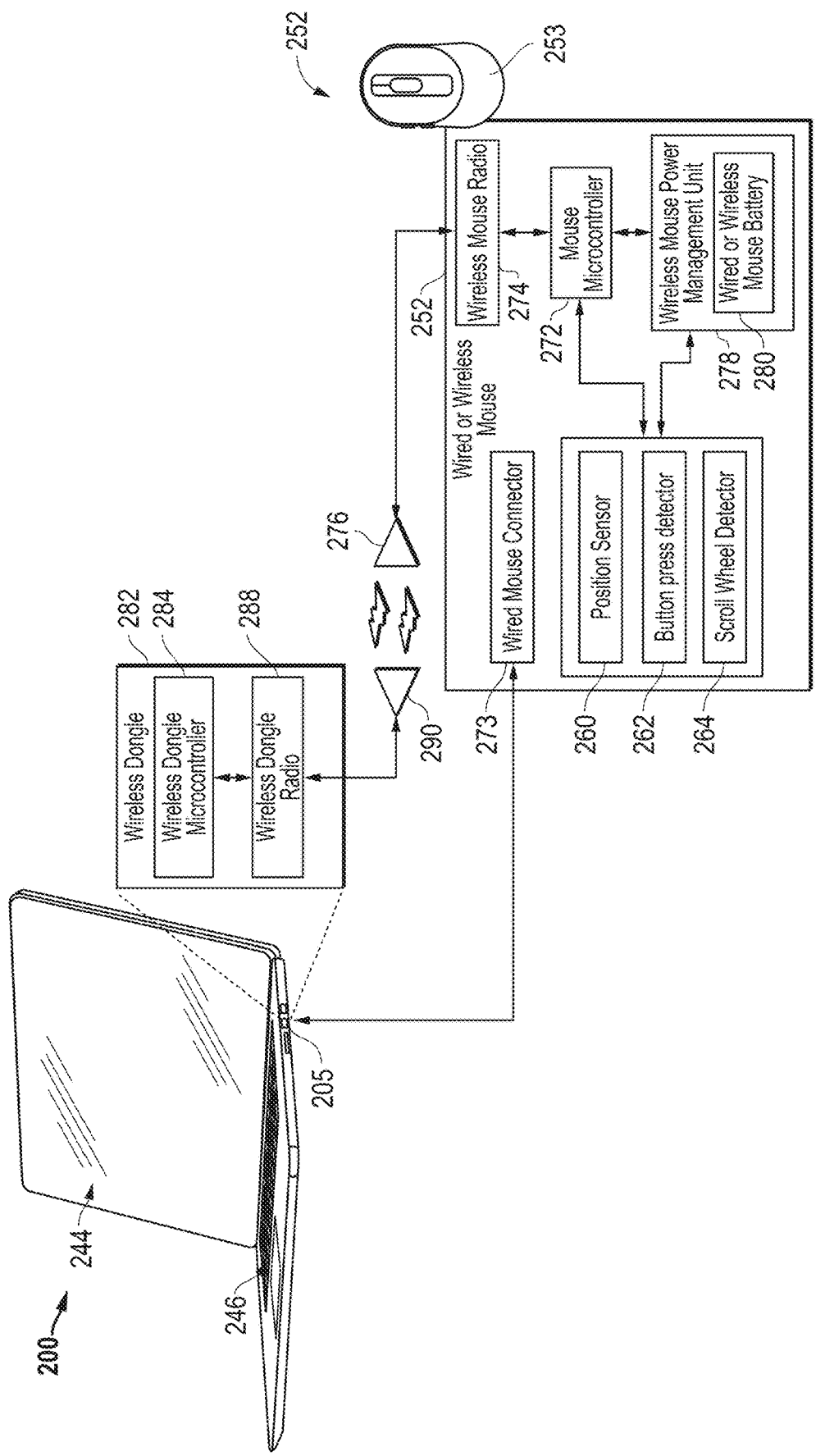
FIG. 2 is a graphic diagram and block diagram a mouse with an information handling system according to an embodiment of the present disclosure.

FIG. 2 is a graphic diagram of an I/O device such as a wired or wireless mouse 252 operatively coupled to an information handling system 200 via a port on the information handling system according to an embodiment of the present disclosure. In the embodiment of the wireless mouse 252, the information handling system 200 may include a wireless dongle 282 at a port of the information handling system 200. In another embodiments, a wired mouse 252 may include a cable to operatively couple to a port of the information handling system 200. The wired or wireless mouse 252 includes a mouse housing 253 including a first injection molded inner housing shell of ocean bound plastic (OBP) and a second injection molded outer shell according to embodiments herein.

The wired or wireless mouse 252 may include a mouse microcontroller 272 to securely transmit data packets to and from the wired or wireless mouse 252 to a wireless dongle 282 or to the information handling system 200 via a wired or wireless communication link according to an embodiment of the present disclosure. It is appreciated that, instead of a wireless dongle 282 being inserted into a universal serial bus (USB) port of the information handling system in order to wirelessly couple the information handling system 200 to the wireless mouse 252, the information handling system 200 may include a wireless interface adapter with hardware processing resource to wirelessly couple the information handling system 200 to the wireless mouse 252. In another embodiment, it is also appreciated that a wired mouse 252 in one example embodiment may be operably coupled to the information handling system 200 via a cable such as via a USB port in one example. Thus, although the present specification describes and shows a wireless mouse option of the wired or wireless mouse 252 in several embodiments herein, the present specification contemplates that the mouse housing 253 including a first injection molded inner housing shell of ocean bound plastic (OBP) and a second injection molded outer shell may be used with a wired mouse according to embodiments herein.

As described herein, the wireless coupling of the information handling system 200 to the wireless mouse 252 option may be accomplished, in one embodiment, via operation of the wireless interface adapter (not shown), radio (not shown), and RF front end (not shown) to communicate with any wireless mouse 252 via any sufficient wireless protocol, such as a BLE 2.4 GHz band in an embodiment. In another embodiment, the wireless coupling of the information handling system 200 to the wireless I/O device may be accomplished, in one embodiment, via operation of the wireless dongle radio 288 and wireless dongle antenna 290 as managed by a wireless dongle microcontroller 284 to communicate with the wireless mouse 252, for example, via a BLE 2.4 GHz band. Therefore, the wireless communication may be conducted using an internal wireless communication system within the information handling system 200 or via a wireless dongle 282 operatively coupled to the information handling system 200 via a USB port or a wired communication via a cable with a USB port in various example embodiments. It is further appreciated that any wired or wireless mouse 252 may receive input from a user and transmit such input to or receive output from the information handling system 200.

The wireless dongle 282 and its wireless dongle radio 288 and wireless dongle antenna 290 may transmit and receive information necessary to pair the wireless mouse 252 with the information handling system 200, such as, for example, pairing or wireless communication profiles for pairing the information handling system 200 and the wireless mouse 252. In an embodiment, the wireless mouse 252 with its wireless mouse radio 274 and wireless mouse antenna 276 may initiate this pairing process instead of the wireless dongle 282. Therefore, the present specification contemplates that an initial pairing process may be initiated either by the wireless dongle 282 or the wireless mouse 252. Such pairing or wireless communication profiles may operate to identify the wireless mouse 252 as a device authorized to transceive data with the information handling system 200 and/or the wireless dongle 282 under the paired wireless protocol, as well as information sufficient to identify the wireless mouse 252, such as a Media Access Control (MAC) address, IP address, or model number, among other identifying data. In other embodiments, the mouse 252 may be wired as described above and model type may be identified to mouse drivers executing on the information handling system 200.

It is appreciated that the wired or wireless mouse 252 may also comprise similar components such as microcontroller 272 and input detectors such as position sensor 260, button press detector 262 and scroll wheel detector 264. The wired or wireless mouse options of wired or wireless mouse 252 may have differing wired or wireless mouse power management units 278 depending on whether battery power from a wireless mouse battery 280 is relied upon or a wired power source is relied upon to power the wired or wireless mouse 252. The power source, such as a battery 280 or power source allow the wired or wireless mouse 252 to operate as a pointing device and an input/output device to track cursor movement from position sensor 260 or inputs received from a scroll wheel or buttons according to the embodiments described herein. For example, the wired or wireless mouse 252 also includes a mouse controller 272, a wired or wireless mouse power management unit 278 which may include a battery 280 and a wireless mouse radio 274 or a wired mouse connector 273 for operable coupling to the information handling system 200. Further, the wired or wireless mouse 252 may include a position sensor 260, a button press detector 262, a scroll wheel detector 264, or any other sensor or detector to detect input received from a user using the wired or wireless mouse 252. The wired or wireless mouse 252 may be any type of mouse including an optical mouse, an inertial or gyroscopic mouse, a mechanical mouse, a magnetic mouse, or other mouse position sensor 260 type. For example, an optical mouse may include a position sensor having an LED and array of photodiodes to detect position movement and translate the same to cursor movement on display device 206. The position sensor may include an LED sensor system, a motion sensor, a mechanical sensor such as a ball and encoder sensor or the like. The wired or wireless mouse 252 may also include a plurality of buttons and button press detectors 262 to detect when a "click" button has been actuated such as for selection of an item on a display screen 206 or for other functions. Further, wired or wireless mouse 252 may also have a scroll wheel or other receiver to detect scrolling input or the like and include a scroll wheel detector 264. The scroll wheel detector 264 may also be mechanical, optical, capacitive, or of some other encoder system for detecting scroll input or other input according to embodiments of the present disclosure.

Figure 3A:
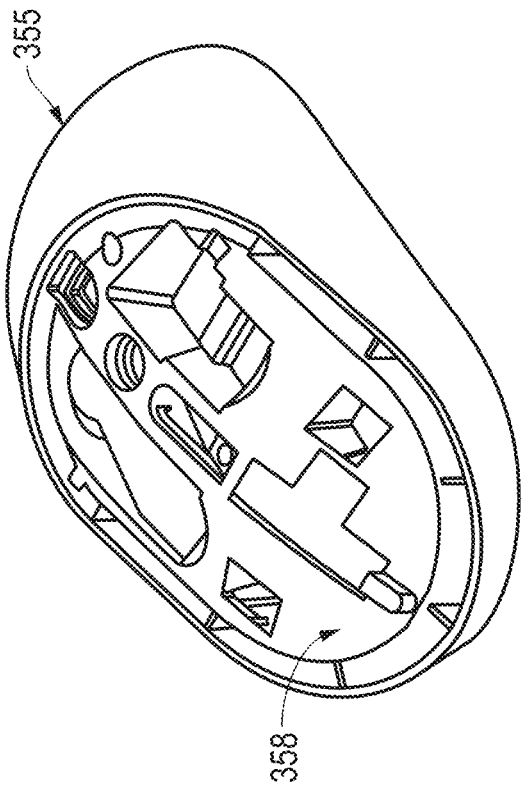
FIG. 3A is a graphic diagram perspective view of an injection molded mouse housing.
Figure 3B:
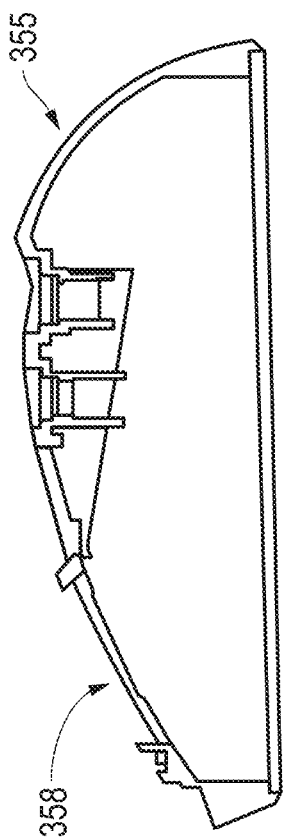
FIG. 3B is a graphic diagram cut-away side view of an injection molded mouse housing.

FIG. 3A is a perspective view graphic diagram of an injection molded mouse housing for a wired or wireless mouse using a single injection of ocean bound plastic. FIG. 3B is a cross-section view graphic diagram of the injection molded mouse housing for the wired or wireless mouse using a single injection of ocean bound plastic. As described herein, the wired or wireless mouse according to embodiments herein may include a housing made at least partially of ocean bound plastic (OBP), that is, plastic that may not be non-commercially recyclable or commercially recyclable that may be a risk of ending up in the ocean. This plastic may have already been in the ocean, shorelines, waterways, or may have been collected nearby to shorelines and re-utilized. Such re-utilization may reduce waste and carbon footprints of manufacture of items by avoiding manufacture and use of virgin plastics that may be eventually introduced to the waste stream. Use of these OBP materials provides a market and incentives or supports clean up of such plastics from waterways, shorelines, oceans or nearby areas. However, often collected OBP has been exposed to sun or saltwater and may be of limited use in commercial applications due to determinations that such recycled OBP material in a final product may warp at temperature or environmental extremes when used in housing for products such as a computer mouse. Thus, as shown in FIGS. 3A and 3B, a portion of the mouse housing 355 using OBP 358 in a single injection may be subject to warping when exposed to high or cold temperatures such as during shipping or storage due to instability in the OBP material.

Figure 4A:
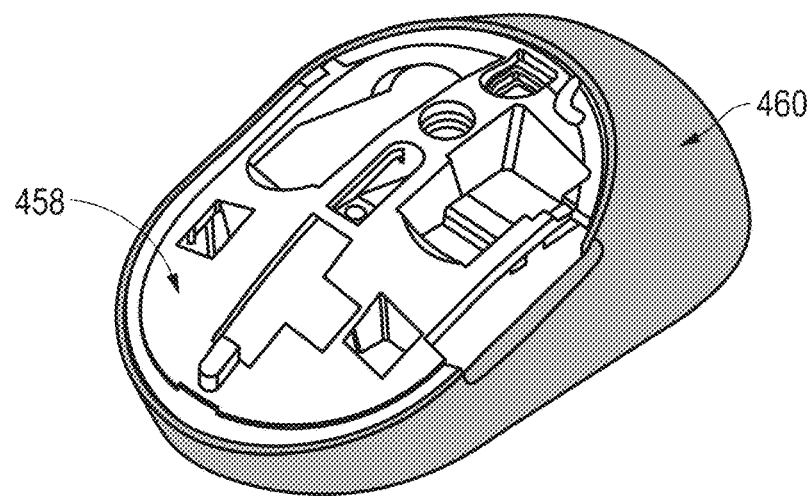
FIG. 4A is a graphic diagram perspective view of a double-injection molded mouse housing with a second injection mold outer shell supporting a first injection molded inner shell that utilizes ocean bound plastic (OBP) according to an embodiment of the present disclosure.
Figure 4B:
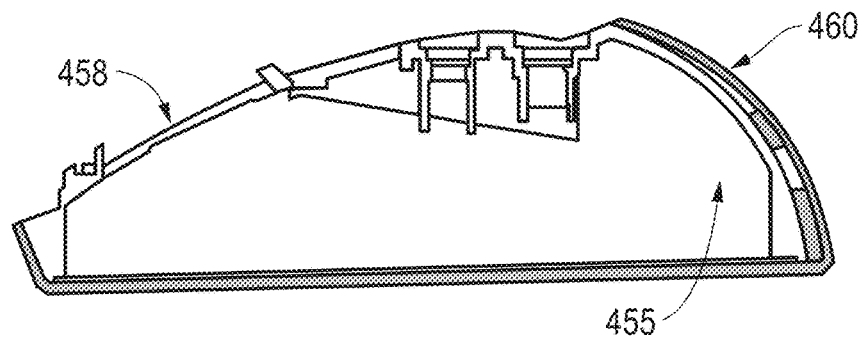
FIG. 4B is a graphic diagram cut-away side view of a double-injection molded mouse housing with a second injection mold outer shell supporting the first injection molded inner shell according to an embodiment of the present disclosure.
Figure 4C:
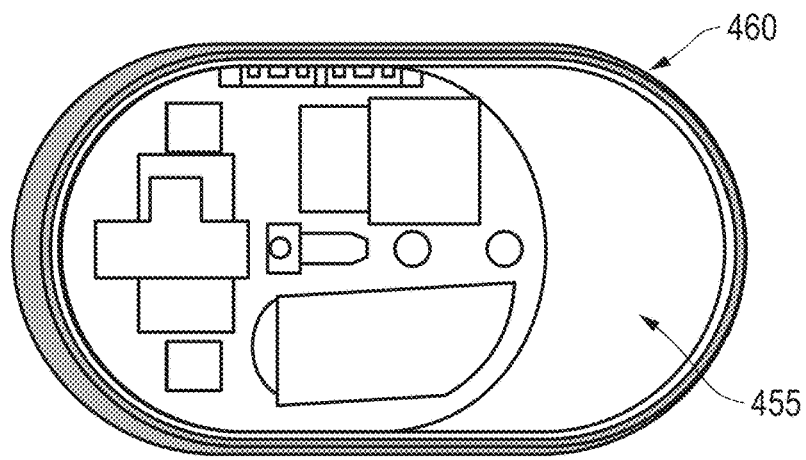
FIG. 4C is a graphic diagram bottom view of a second injection mold outer shell supporting the injection molded inner shell for a double-injection molded mouse housing according to an embodiment of the present disclosure.

FIG. 4A is a perspective view graphic diagram of a double-injection molded mouse housing with a first injection molded inner housing shell and a second injection molded outer housing shell for a wired or wireless mouse according to an embodiment of the present disclosure. FIG. 4B is a cross-section view graphic diagram of the double-injection molded mouse housing with the first injection molded inner housing shell and a second injection molded outer housing shell for the wired or wireless mouse according to an embodiment of the present disclosure. FIG. 4C is a bottom view graphic diagram of the double-injection molded mouse housing with the first injection molded inner housing shell and a second injection molded outer housing shell for the wired or wireless mouse according to an embodiment of the present disclosure. In embodiments of the present disclosure, a computer mouse housing is formed as a double-injection molded mouse housing with a first injection molded inner housing shell 458 comprising the OBP material 455. This first injection molded inner housing shell 458 may provide internal structure for the housing of the mouse using the OBP material 455. The mouse housing structure of the double-injection molded mouse housing in FIG. 4A, FIG. 4B, and FIG. 4C may include a second injection molded outer housing shell 460 (shown with shading) comprising a more stable material such as a post-consumer recycled acrylonitrile butadiene styrene (ABS), polyethylene terephthalate (PET) of various grades, or other virgin or post-consumer recycled plastic that may strengthen and stabilize the mouse housing from warping by forming a supportive outer shell according to embodiments herein. It is understood that the injection molding process may occur in any order to form the double-injection molded mouse housing, that is, the more stable outer housing shell material, such as ABS may be injected first and the OCB material for the inner shell housing may be injected second in some embodiments.

By use of the first injection molded inner housing shell 458 comprised of OBP 455, it is appreciated that although a wired or wireless mouse may require additional injection molded portions of a different material, such as a second injection molded outer housing shell 460 (shaded) with a higher tolerance to heat or warping, the amount of new plastic or processed, recycled plastic, such as post-consumer recycled ABS, may be reduced in forming the double-injection molded mouse housing. As can be seen in FIG. 4A, FIG. 4B, and FIG. 4C, the first injection molded inner housing shell 458 of OBP 455 may comprise a substantial portion of the double-injection molded mouse housing for the wired or wireless mouse according to embodiments herein with a second injection molded outer housing shell 460 around the OBP part to strengthen the overall double-injection molded mouse housing. In an example embodiment, the OBP material may be DuraPET™ 0624 NLP-OC oceanbound plastic resin from PolyVisions, Inc. may be used for a first injection mold of the first injection molded inner housing shell 458.

Figure 5:
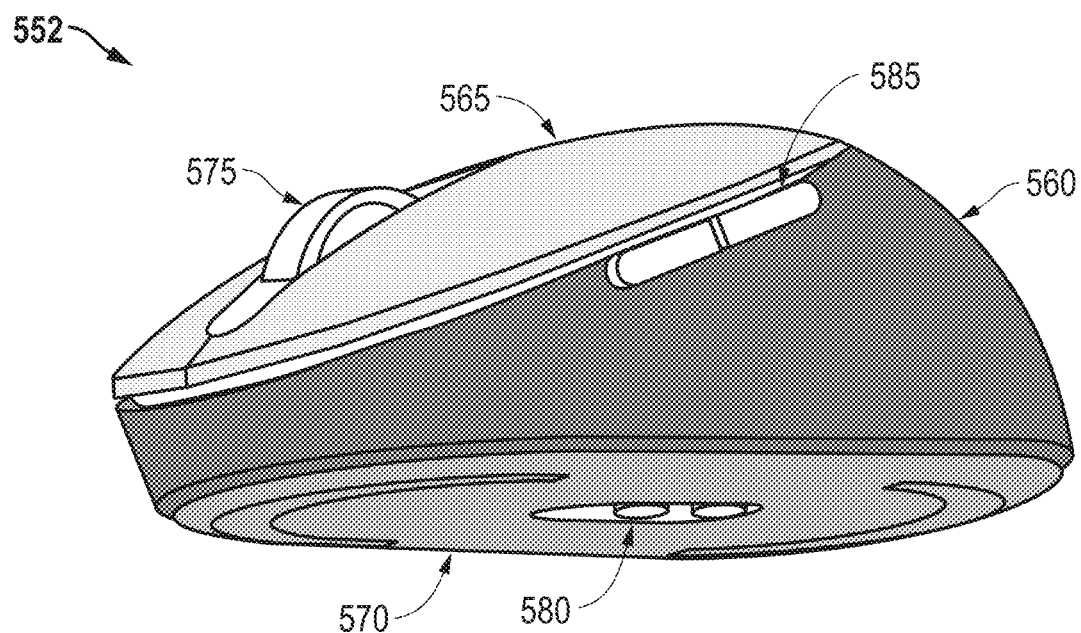
FIG. 5 is a graphic diagram perspective view of a mouse with a double-injection molded mouse housing having the second injection mold outer shell supporting the injection molded inner shell and a keyplate panel and bottom case panel according to an embodiment of the present disclosure.

FIG. 5 is a perspective view graphic diagram of an assembled mouse with double-injection molded mouse housing including the first injection molded inner housing shell and the second injection molded outer housing shell to form the double-injection molded mouse housing as well as keyplate panel and bottom case housing panel according to an embodiment herein. The wired or wireless mouse 552 shown in the current embodiment includes a key plate panel 565 with a scroll wheel 575 shown between two key plate panel click buttons formed with the surface of the key plate panel that may be deflected downward to trigger a button press detector according to an embodiment. The key plate panel 565 is set into or on top of the first injection molded inner housing shell and the second injection molded outer housing shell (shown in darker shading) forming the double-injection molded mouse housing 560. The key plate panel 565 may be made of a durable plastic material such as the post-consumer recycled ABS or PET. The key plate panel 565 may be formed as a single shot injection mold and operatively coupled to the top of the mouse housing via an interference fit, fastener, adhesive, or the like in various embodiments.

In the present embodiment, the second injection molded outer housing shell is comprised of post-consumer recycled material or a virgin plastic material such as ABS or PET that has greater strength and stability. The second injection molded outer housing shell is injected over the first injection molded inner housing shell comprising OBP and is exposed. This second injection molded outer housing shell of the double-injection molded mouse housing 560 is held by the user of the mouse with the formed double-injection molded mouse housing 560. The first injection molded inner housing shell of OBP is formed underneath and supported and strengthened by the second injection molded outer housing shell but may form an under structure and permit less post-consumer recycled or virgin plastic to be used when manufacturing the double-injection molded mouse housing 560.

Wired or wireless mouse 552 also includes a bottom case panel 570 (shown in lighter shading) in which a mouse movement or tracking position sensor 580 is disposed to detect or track mouse movement when interfaced with a mouse pad, desktop, tabletop, or other surface. The bottom case panel may have an aperture for the position sensor 580 to access below the wired or wireless mouse 552 to detect changes in position on a surface for cursor tracking among other inputs according to embodiments herein. The bottom case panel 570 may formed of a single shot post-consumer recycled or virgin ABS, PET or other plastic and inserted as a bottom cover or case plate 570 for the components of the mouse inside including a printed circuit board with components such as a mouse controller, mouse radio or connector, position sensor 580, button press detectors, scroll wheel detectors, and other components according to embodiments herein. The bottom case panel 570 may be operably coupled to the wired or wireless mouse 552 and the double-injection molded mouse housing 560 via an interference fit, fastener, adhesive or the like in various embodiments.

Wired or wireless mouse 552 may include the position sensor 580 in the bottoms case plate 570, as scroll wheel 575 with scroll wheel detector internal to the mouse 552, and a toggle button or buttons 585 in various embodiments. Further, the key plate 565 may be operably coupled to the double-injection molded mouse housing 560 such that a scroll wheel 575 is accessible and click buttons are formed in a dive board fashion on either side to trigger a button press detector or with pressure sensors to detect a press on either side of scroll wheel 575. Other types of features and inputs for wired or wireless mouse 552 as understood in the art is also contemplated in various embodiments herein.

Figure 6:
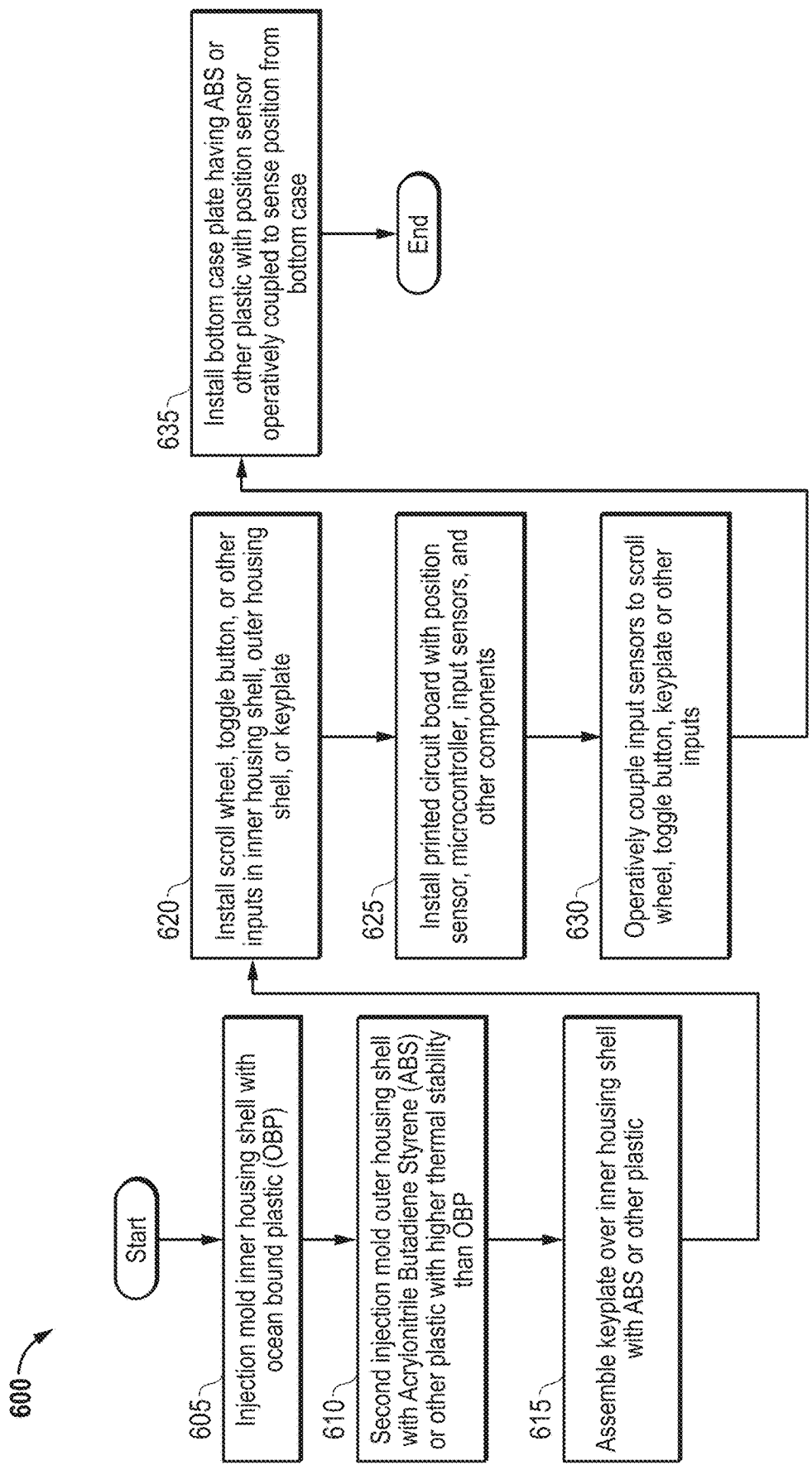
FIG. 6 is a flow diagram of a method of manufacture for a mouse having a double-injection molded mouse housing with a second injection mold outer shell supporting a first injection molded inner shell utilizing OBP according to an embodiment of the present disclosure.

FIG. 6 is a block flow diagram of a method 600 of assembling a mouse having a double-injection molded mouse housing with the first injection molded inner housing shell and the second injection molded outer housing shell according to an embodiment of the present disclosure. The method 600 describes, in an embodiment, the assembly of a wired or wireless mouse according to embodiments herein having a first injection molded inner housing shell formed of OBP and a second injection molded outer housing shell for support and reinforcement of the material used with the first injection molded inner housing shell according to embodiments herein.

In an embodiment, the method 600 may include, at block 605, with forming the first injection molded inner housing shell by injection molding the double-injection molded mouse housing using OCB, such as DuraPET™ 0624 NLP-OC oceanbound plastic resin from PolyVisions, Inc. The first injection molded inner housing shell causes the OCB material to be extruded into a form with the first injection mold having the first injection molded inner housing shell.

At block 610, a second injection mold may be used or the first injection mold may be modifiable to allow for a second material to be injection molded to the mouse housing injection mold to form a second outer housing shell for the wired or wireless mouse. In an embodiment, the second material to be injection molded into the injection mold of the mouse housing to form the double-injection molded mouse housing. The second material may be a second plastic such as acrylonitrile butadiene styrene (ABS) or polyethylene terephthalate (PET) that may come from post-consumer recycled materials or from virgin materials. The second plastic material, such as ABS or PET may have a higher resistance to warping and tolerance to temperature or other environmental changes than the OBS. An outer portion for the mold used to form the mouse housing may be switched or altered before the second injection mold step occurs to extrude the more stable material, such as ABS or PET, to form the second outer housing shell for the double-injection molded mouse housing of the wired or wireless mouse in an embodiment.

In other embodiments, the mold for the mouse housing may be injection molded in a reverse order such that the injection molded outer housing shell is formed first of ABS or other plastic material in the mold such as described at block 610 and the OCB is then injection molded into the mold for the mouse housing, as described in block 605, as a second injection mold step after the mold is modified to accept the second extrusion of OCB material. The mold for the mouse housing may be modified by removal of an inner mold portion and replacement with a new inner mold to allow for the OCB to be extruded as a second injection mold step in some embodiments. In either of the above embodiments, the two injection mold steps to extrude two type of material with alteration of the outer or inner portion of the mold occurs to form a double-injection molded mouse housing with OCB as the inner housing shell and ABS or another plastic as an outer housing shell.

At block 615, the keyplate may be formed of a single shot plastic material, such as ABS or PET, that may be durable. The keyplate includes a top portion of the wired or wireless mouse with a plurality of portions or extensions in a front portion to form a dive board type keyplate for actuation of a button press detector disposed below in the double-injection molded mouse housing for clicking or selecting displayed items with the mouse. The keyplate may be formed and then operatively coupled to the double-injection molded mouse housing having the first injection molded inner housing shell and second injection molded outer housing shell in an embodiment. The keyplate may be operatively coupled to the double-injection molded mouse housing via an interference fit, adhesive, fasteners such as screws or clips, or by other means known in the art in various embodiments. In an embodiment, the key plate is formed to provide for one or more input/output structures on the mouse such as a scroll wheel, buttons such as toggle buttons or side buttons, or the like.

At block 620, the input output component of the mouse such as a scroll wheel, any toggle buttons or other buttons on the external surface of the wired or wireless mouse may be installed. For example, the scroll wheel and any sensor or encoder structure associated therewith may be installed in a slot in the keyplate of the wired or wireless mouse and inside, at least partially, of the double-injection molded mouse housing in an embodiment. Other buttons, such as toggle buttons or external buttons may be installed in some embodiments in the double-injection molded mouse housing or operatively coupled keyplate.

The method 600 includes, at block 625, installing a printed circuit board with a mouse microcontroller, position sensor, input sensors such as button press detectors and scroll wheel detectors, power management unit, or other components in the double-injection molded mouse housing. Additional components may be installed in the double-injection molded mouse housing and operatively coupled thereto via interference fit, fasteners, adhesives or the like. Additional components installed may include a mouse radio for a wireless mouse, mouse connector for a wired mouse, power management unit and battery casing, power and data connections, as well as any mechanical or optical components, such as an LED and photosensors, needed for operation of the wired or wireless mouse in various embodiments.

At block 630, the microcontroller, power management or power source at the wired or wireless mouse are operatively coupled via power connectivity to the microcontroller, position sensor, the scroll wheel detector, the button press detector and other components on the PCB in an embodiment. Other components may be operatively coupled via data communication lines and power include a mouse radio or connector, as well as other components within the double-injection molded mouse housing and the mouse.

The method 600 may proceed to block 635, with the formation of a bottom case panel and operative coupling of the bottom case panel with the position sensor to the bottom of the double-injection molded mouse housing of the wired or wireless mouse. The bottom case panel may be made of a single shot injection molded bottom case panel formed of a durable plastic material such as post-consumer recycled ABS or other plastic or a virgin plastic in some embodiments. The plastics used may also be a blend. The formed bottom case panel is operatively coupled to the bottom of the double-injection molded mouse housing to enclose the printed circuit board and components of the mouse therein. The position sensor is formed to extend or be accessible via a position sensor port or aperture in the bottom case panel in an embodiment to detect movement of the mouse for position tracking to correspond to cursor tracking with the mouse. The bottom case panel may be operatively coupled to the double-injection molded mouse housing via interference fit, fasteners, adhesives, or other methods known in the art. With the operative coupling of the bottom case panel on the double-injection molded mouse housing of the wired or wireless mouse with the position sensor formed to be operational through the bottom case panel, the wired or wireless mouse with the double-injection molded mouse housing assembly may be complete at block 635 and the method 600 may end.

The blocks and steps of the flow diagrams of FIG. 6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A double-injection molded top mouse housing portion of a mouse housing for a computer mouse comprising:
    a first injection molded inner housing shell comprised of ocean bound plastic (OBP) of the double-injection molded top mouse housing;
    a second injection molded outer housing shell comprised of a plastic with higher thermal stability than the OBP to form the double-injection molded top mouse housing;
    a keyplate panel operatively coupled to the top of the double-injection molded top mouse housing; and
    a bottom case panel operatively coupled to the bottom of the double-injection molded top mouse housing to form the mouse housing for the computer mouse.

2. The double-injection molded top mouse housing portion of the mouse housing of claim 1, wherein the second injection molded outer housing shell comprises post-consumer recycled acrylonitrile butadiene styrene (ABS).

3. The double-injection molded top mouse housing portion of the mouse housing of claim 1 further comprising:
    the first injection molded inner housing shell of OBP of the double-injection molded op mouse housing portion to contain a printed circuit board (PCB) including a mouse controller and position sensor for the computer mouse.

4. The double-injection molded top mouse housing portion of the mouse housing of claim 1 further comprising:
    the first injection molded inner housing shell of OBP of the double-injection molded top mouse housing portion to contain a PCB including a wireless mouse radio and where the computer mouse is a wireless computer mouse.

5. The double-injection molded top mouse housing portion of the mouse housing of claim 1 further comprising:
    the keyplate panel is formed of plastic and operatively coupled to the top of the double-injection molded top mouse housing portion of the mouse housing via an interference fit with the first injection molded inner housing shell comprised of the OBP.

6. The double-injection molded top mouse housing portion of the mouse housing of claim 1 further comprising:
    the bottom case panel is formed of plastic and operatively coupled to the bottom of the double-injection molded top mouse housing portion of the mouse housing via a fastener.

7. The double-injection molded top mouse housing portion of the mouse housing of claim 1 further comprising:
    the keyplate panel is formed of plastic and includes plastic keyplate extensions forming a dive board type keyplate pivoted via operative coupling to the first injection molded inner housing shell comprised of the OBP to actuate a button press detector in the double-injection molded top mouse housing portion of the mouse housing and an aperture for a scroll wheel in the top of the double-injection molded top mouse housing portion of the mouse housing.

8. The double-injection molded top mouse housing portion of the mouse housing of claim 1, wherein the second injection molded outer housing shell comprises post-consumer recycled polyethylene terephthalate (PET).

9. A method of assembly of a computer mouse with a double-injection molded top mouse housing portion of a mouse housing comprising:
    extruding a first plastic into an injection mold for a first injection molded inner housing shell to form the double-injection molded top mouse housing portion, where the first plastic is comprised of ocean bound plastic (OBP);
    extruding a second plastic into the injection mold adjusted for a second injection molded outer housing shell, where the second plastic of the second injection molded outer housing shell has a higher thermal stability than the OBP to form structural support around the first injection molded inner housing shell;
    operatively coupling a printed circuit board including a microcontroller and position detector within the double-injection molded top mouse housing portion;
    operatively coupling a keyplate panel to the top of the double-injection molded top mouse housing portion via a fastener or an interference fit; and
    operatively coupling a bottom case panel to the bottom of the double-injection molded top mouse housing portion via a fastener or an interference fit to form the mouse housing for the computer mouse.

10. The method of claim 9 further comprising:
operatively coupling a scroll wheel and encoder scroll wheel detector in the double-injection molded top mouse housing portion and under the keyplate panel, such that the scroll wheel extends through an aperture in the keyplate panel on the top of the double-injection molded top mouse housing portion of the mouse housing.

11. The method of claim 9 further comprising:
adjusting the injection mold for the double-injection molded top mouse housing portion between extruding a first plastic into an injection mold for the first injection molded inner housing shell and extruding the second plastic into the injection mold adjusted for the second injection molded outer housing shell to form two shell layers for the double-injection molded top mouse housing portion of the mouse housing.

12. The method of claim 9 further comprising:
forming the keyplate panel of plastic via a single shot injection mold process; and
forming the bottom case panel of plastic via a single shot injection mold process.

13. The method of claim 9 further comprising:
operatively coupling the bottom case panel to the bottom of the double-injection molded top mouse housing portion of the mouse housing such that the position detector installed in the double-injection molded top mouse housing has access through an aperture in the bottom case panel to detect position changes.

14. The method of claim 9 wherein the second plastic of the second injection molded outer housing shell comprises post-consumer recycled acrylonitrile butadiene styrene (ABS).

15. The method of claim 9 further comprising:
operatively coupling the printed circuit board including a wireless mouse radio where the computer mouse is a wireless computer mouse.

16. A double-injection molded top mouse housing portion of a mouse housing for a computer mouse comprising:
a first injection molded outer housing shell of a first plastic of the double-injection molded top mouse housing portion;
a second injection molded inner housing shell comprised of a second plastic that is an ocean bound plastic (OBP) to form the double-injection molded top mouse housing portion, wherein the first plastic of the first injection molded outer housing shell has a higher thermal stability than the OBP;
a keyplate panel operatively coupled to the top of the double-injection molded top mouse housing; and
a bottom case panel operatively coupled to the bottom of the double-injection molded top mouse housing portion to form the mouse housing for the computer mouse.

17. The double-injection molded top mouse housing portion of the mouse housing of claim 16, wherein the first plastic of the first injection molded outer housing shell comprises post-consumer recycled acrylonitrile butadiene styrene (ABS).

18. The double-injection molded top mouse housing portion of the mouse housing of claim 16 further comprising:
the second injection molded inner housing shell comprised of the OBP of the double-injection molded top mouse housing portion to contain a printed circuit board (PCB) including a mouse controller and position sensor for the computer mouse.

19. The double-injection molded top mouse housing portion of the mouse housing of claim 16 further comprising:
the keyplate panel is formed of plastic and operatively coupled to the top of the double-injection molded top mouse housing portion of the mouse housing via an interference fit with the first injection molded inner housing shell comprised of the OBP.

20. The double-injection molded top mouse housing portion of the moose housing of claim 16 further comprising:
the bottom case panel is formed of plastic and operatively coupled to the bottom of the double-injection molded top mouse housing portion of the mouse housing via a fastener.

* * * * *